United States Patent
Anderson et al.

(10) Patent No.: US 9,003,331 B1
(45) Date of Patent: Apr. 7, 2015

(54) GRAPHICAL USER INTERFACE DYNAMIC MENU SLOT

(75) Inventors: Keith Anderson, Overland Park, KS (US); Christopher J. Bierbaum, Overland Park, KS (US); Kevin Zhu, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1410 days.

(21) Appl. No.: 12/496,420

(22) Filed: Jul. 1, 2009

(51) Int. Cl.
*G06F 3/048* (2013.01)
*G06F 3/0482* (2013.01)

(52) U.S. Cl.
CPC .............. *G06F 3/0482* (2013.01); *G06F 3/048* (2013.01)

(58) Field of Classification Search
CPC ................................ G06F 3/048; G06F 3/0482
USPC .................. 715/825, 810, 811, 826, 744, 745
See application file for complete search history.

(56) References Cited

U.S. PATENT DOCUMENTS

| | | | | |
|---|---|---|---|---|
| 5,119,475 A | * | 6/1992 | Smith et al. ..................... | 715/866 |
| 7,246,329 B1 | * | 7/2007 | Miura et al. ..................... | 715/810 |
| 7,650,572 B2 | * | 1/2010 | Olander et al. ................ | 715/762 |
| 2002/0147642 A1 | * | 10/2002 | Avallone et al. ................ | 705/14 |
| 2003/0007012 A1 | * | 1/2003 | Bate .............................. | 345/825 |
| 2005/0166148 A1 | * | 7/2005 | Garding ........................ | 715/708 |
| 2005/0204309 A1 | * | 9/2005 | Szeto ............................ | 715/811 |
| 2005/0246662 A1 | * | 11/2005 | Torrey et al. .................. | 715/841 |
| 2007/0093258 A1 | * | 4/2007 | Steenstra et al. ........... | 455/456.5 |
| 2007/0130522 A1 | * | 6/2007 | Mansell et al. ................ | 715/744 |
| 2007/0271139 A1 | * | 11/2007 | Fiorini ............................ | 705/14 |
| 2007/0300261 A1 | * | 12/2007 | Barton et al. ................... | 725/58 |
| 2008/0010130 A1 | * | 1/2008 | Pyhalammi et al. ............ | 705/14 |
| 2008/0261634 A1 | * | 10/2008 | Viana et al. ................... | 455/466 |
| 2009/0003265 A1 | * | 1/2009 | Agarwal et al. ............... | 370/328 |
| 2009/0186575 A1 | * | 7/2009 | Cedo Perpinya et al. .... | 455/41.2 |
| 2010/0125644 A1 | * | 5/2010 | Silverman et al. ............ | 709/217 |
| 2010/0179876 A1 | * | 7/2010 | Holte .......................... | 705/14.54 |

FOREIGN PATENT DOCUMENTS

WO    WO 2009050590 A2  *  4/2009

* cited by examiner

*Primary Examiner* — Patrick Riegler (57) ABSTRACT

A computer based method is provided. The computer based method comprises a first electronic device launching an application and, in response to launching the application, the first electronic device receiving a first message from a second electronic device. The first message comprises a first link. The computer based method further comprises the first electronic device configuring a graphical user interface of the application to couple a dynamic selector of the graphical user interface to the first link and presenting a first screen of the graphical user interface, the first screen comprising the dynamic selector and a plurality of static selectors, wherein selecting the dynamic selector activates the first link.

18 Claims, 8 Drawing Sheets

GRAPHICAL USER INTERFACE DYNAMIC MENU SLOT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communications networks provide nearly ubiquitous communications connectivity in the United States. Most residents of the United States possess a mobile communications device supported by a corresponding wireless communications service plan. While initially wireless communications networks focused on delivering voice communications services, increasingly wireless communications networks are being upgraded to improve delivery of wireless data communications services. Some wireless communications service providers project the future growth of wireless data communications services to be the next important telecommunications business growth opportunity.

SUMMARY

In an embodiment, a computer based method is disclosed. The computer based method comprises a first electronic device launching an application and, in response to launching the application, the first electronic device receiving a first message from a second electronic device. The first message comprises a first link. The computer based method further comprises the first electronic device configuring a graphical user interface of the application to couple a dynamic selector of the graphical user interface to the first link and presenting a first screen of the graphical user interface, the first screen comprising the dynamic selector and a plurality of static selectors, wherein selecting the dynamic selector activates the first link.

In another embodiment, another computer based method is disclosed. The computer based method comprises the computer receiving a plurality of links and the computer receiving a first message from an electronic device. The first message comprises an identity of the electronic device and an identity of a first event associated with a graphical user interface of an application executing on the electronic device. The computer based method further comprises the computer selecting a first link from the plurality of links based at least on the identity of the electronic device and on the identity of the first event and the computer sending a second message to the electronic device, the second message comprising the first link. The electronic device stitches the first link into a dynamic selector of the graphical user interface of the application executing on the electronic device.

In another embodiment, a system is disclosed. The system comprises a processor and an application. When executed by the processor, the application receives a plurality of marketing offers. Each marketing offer comprising a link to content associated with the marketing offer, at least a first bid price associated with presenting the link in a dynamic menu slot of a graphical user interface presented on an electronic device external to the processor, and a target user profile. The application further receives a first message from a first electronic device, the first message comprising an identity of the first electronic device and an information about an event associated with one of the first electronic device and the graphical user interface presented on the first electronic device. The application further selects a first link associated with one of the plurality of marketing offers based on a correlation of the target user profile of the marketing offer with one of the information about the event and the identity of the first electronic device. The application further transmits a second message to the first electronic device, the second message comprising the first link, wherein the first electronic device stitches the first link into the dynamic menu slot of the graphical user interface.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method are taught to provide a dynamic menu slot for a graphical user interface. In some contexts, the dynamic menu slot may also be referred to as a dynamic selector. In an embodiment, a graphical user interface associated with an application executing on an electronic device comprises a dynamic menu slot that is not statically defined.

In an embodiment, the dynamic menu slot is dynamically associated with metadata, and the metadata that is associated with the dynamic menu slot may change in response to a change of location of the electronic device, a passage of time, to a bidding process, or based on another change. The metadata may be selected, for example by a remote server computer, based on the identity of the electronic device and based on an event, and the remote server computer may send a message to the electronic device instructing that the metadata be associated with the dynamic menu slot by the electronic device. For example, the remote server computer may lookup a user profile based on the identity of the electronic device and based on the current location of the electronic device; identify metadata associated with a retail store related to a hobby identified in the user profile; and send a message instructing the electronic device to make the metadata associated with the retail store be associated with the dynamic menu slot by the electronic device. In an embodiment, the metadata may comprise instructions that, when executed on the electronic device, launch an application on the electronic device. In an embodiment, the metadata may comprise instructions that, when executed on the electronic device, retrieve some information from a remote server.

In an embodiment, the dynamic menu slot may be dynamically associated with a link and/or a reference. For example, in an embodiment, the electronic device receives a message comprising a first link, and the electronic device then couples the first link to and/or stitches the first link into the dynamic menu slot of the graphical user interface screen. In an embodiment, the first link may be an active link, for example a link to electronic content, to an interactive remote application, or to a marketing promotional offer interactive screen. Selection of the dynamic menu slot or dynamic selector invokes the functionality associated with the first link, for example requesting content referenced by the first link. In an embodiment, the first link may be selected by a server based, at least in part, on a user profile associated with the electronic device. In an embodiment, the selection of the first link may be determined by the server based, at least in part, on a bid and/or a target user profile provided by a third party. On an event, for example an event generated by the server or an event generated by the electronic device, the server may select a second link and send the second link in a message to the electronic device. The electronic device couples the second link to the dynamic menu slot of the graphical user interface screen, and subsequent selection of the dynamic menu slot or dynamic selector invokes the functionality associated with the second link, for example requesting content referenced by the second link.

Figure 1:
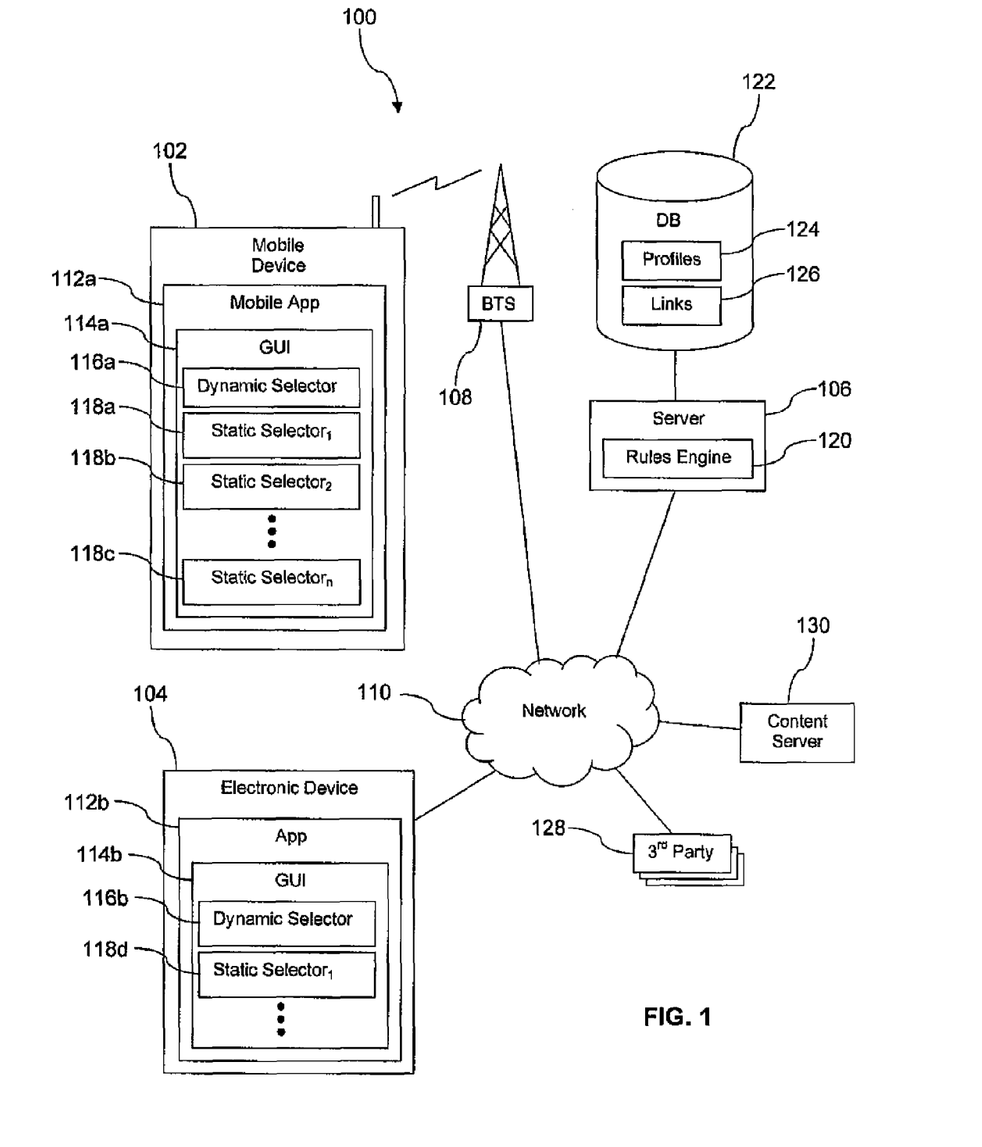
FIG. 1 is an illustration of a communications system according to an embodiment of the disclosure.

Turning now to FIG. 1, a communications system 100 is described. The system 100 comprises a mobile electronic device 102, a stationary electronic device 104, a server 106, a base transceiver station (BTS) 108, and a communications network 110. The mobile electronic device 102 may comprise a plurality of applications, for example the first application 112a. The first application 112a may comprise a graphical user interface (GUI) 114a that includes a dynamic selector 116a, a first static selector 118a, a second static selector 118b, and a third static selector 118c. While a single dynamic selector 116a is shown in FIG. 1, it is understood that the GUI 114a may comprise any number of dynamic selectors. In an embodiment, the GUI 114a may comprise more or fewer static selectors 118. The stationary electronic device 104 may comprise a plurality of applications, for example the second application 112b. The second application 112b may comprise a GUI 114b that includes a dynamic selector 116b and a fourth static selector 118d. While a single dynamic selector 116b is shown in FIG. 1, it is understood that the GUI 114b may comprise any number of dynamic selectors. In an embodiment, the GUI 114b may comprise more static selectors 118.

The mobile electronic device 102 may be communicatively coupled to the server 106 via a wireless communications link to the BTS 108, by a wired link from the BTS 108 to the network 110, and by a wired link from the network 110 to the sever 106. In another embodiment, however, the mobile electronic device 102 may be communicatively coupled to the server 106 by a different path. The network 110 may comprise any combination of public and private communications networks and any combination of data network and voice network. Portions of the network 110 may be provided by wireless communications links. The stationary electronic device 104 may be communicatively coupled to the server 106 via a wired link to the network 110 and by a wired link from the network 110 to the sever 106. In another embodiment, however, the stationary electronic device 104 may be communicatively coupled to the server 106 by a different path. For example, the stationary electronic device 104 may be connected to a wireless local area network and communicate by a wireless link to a wireless access hub, and the wireless access hub may be connected to the network 110 by a wired link. The stationary electronic device 104 may be implemented as a computer system. Computer systems are described in more detail hereinafter.

The server 106 may be implemented as a computer system. The server 106 may execute a rules engine 120. Alternatively, in an embodiment, another application or a plurality of applications that execute on the server 106 may perform the functions attributed by this disclosure to the rules engine 120. The server 106 may communicate with a database 122 that comprises a plurality of user profiles 124 and a plurality of links 126. The server 106 may communicate with a plurality of third parties 128 via the network 110. The electronic devices 102, 104 may communicate with a content server 130 via the network 110. It is understood that the system 100 may comprise any number of mobile electronic devices 102, any number of stationary electronic devices 104, any number of BTS 108, any number of third parties 128, and any number of content servers 130.

In an embodiment, the mobile application 112a may be a firmware application stored in a static memory of the mobile device 102, for example in a read only memory (ROM), in an electrically programmable read only memory (EPROM), and/or in a flash memory of the mobile device 102. In an embodiment, the mobile application 112a may be installed during the manufacturing and/or during assembly of the mobile device 102, before the mobile device 102 is distributed to a retail store or other point of distribution to end users. In an embodiment, the mobile application 112a may never be modified after initial installation into the mobile device 102. In another embodiment, the mobile application 112a may only be modified through an over-the-air (OTA) firmware modification procedure mediated by a provider of wireless communications service, for example an operating company. In some embodiments, the mobile application 112a may be a firmware application that is stored, at least in part, in a secure element of the mobile device 102.

Likewise, in an embodiment, the application 112b may be a firmware application stored in a static memory of the stationary electronic device 104, for example in a (ROM), in an electrically programmable read only memory (EPROM), and/or in a flash memory of the stationary electronic device 104. In an embodiment, the application 112b may be installed during the manufacturing and/or during assembly of the stationary electronic device 104, before the stationary electronic device 104 is distributed to a retail store or other point of distribution to end users. In an embodiment, the application 112b may never be modified after initial installation into the stationary electronic device 104. Alternatively, the application 112b may be a software application stored in a memory of the stationary electronic device 104. In an embodiment, the application 112b may be a software application that is stored on a secondary storage device of the stationary electronic device 104, for example a hard disk drive storage. In an embodiment, the application 112b may be installed, modified, and/or updated from an installation disk, for example from an optical disk, from a compact disk read only memory (CD-ROM), or other portable storage disk.

Figure 2A:
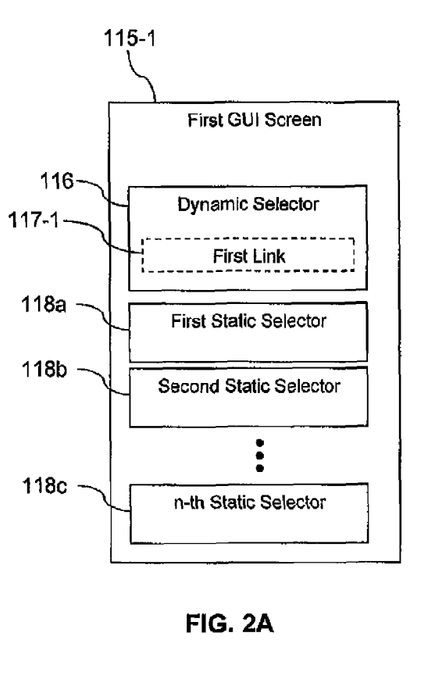
FIG. 2A illustrates a first graphical user interface according to an embodiment of the disclosure.
Figure 2B:
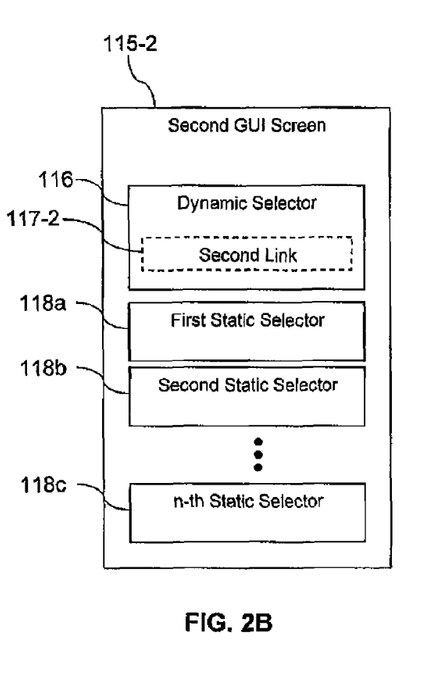
FIG. 2B illustrates a second graphical user interface according to an embodiment of the disclosure.

Turning now to FIG. 2A and FIG. 2B, a first GUI screen 115-1 and a second GUI screen 115-2 are discussed. The first GUI screen 115-1 comprises the dynamic selector 116, the first static selector 118a, the second static selector 118b, and the third static selector 118c. While the dynamic selector 116 is represented in FIG. 2A and FIG. 2B at the top of the list of selectors, it is understood that the dynamic selector 116 may be located anywhere within the selectors of the GUI screen 115, for example at the bottom of the selectors, in the middle of the selectors, or at some other relative position among the selectors of the GUI screen 115. In an embodiment, the location of the dynamic selector 116 among static selectors may depend upon the subject GUI screen 115 with which the dynamic selector 116 is associated. Additionally, while one dynamic selector 116 is represented in FIG. 2A and FIG. 2B, it is understood that the GUI screen 115 may have two or more different dynamic selectors. The static selectors 118a, 118b, 118c may invoke a function of the first GUI screen 115-1 and/or a function of the application 112. For example, in the case that the application 112 is a banking application, the first static selector 118a may invoke a display of a banking balance in a text window on a display of the electronic device 102; the second static selector 118b may invoke a pop-up display of a banking funds transfer dialog box on the display of the electronic device 102; and the third static selector 118c may invoke establishing a voice call to a banking service representative using a communications interface of the electronic device 102.

In the first GUI screen 115-1, the dynamic selector 116 is coupled to and/or configured with a first link 117-1, such that selection of the dynamic selector 116 in the first GUI screen 115-1 invokes the functionality associated with the first link 117-1, for example requesting content referenced by the first link 117-1. The first link 117-1 may have been defined to the application 112 when the application 112 was launched. As an example, the first link 117-1 may reference content describing the services of a securities brokerage firm. Activating and/or selecting the dynamic selector 116 presented in the first GUI screen 115-1 may, for example, invoke the downloading and display of a home page of the securities brokerage firm or a marketing message provided by the securities brokerage firm on the display of the electronic device 102. As another example, the first link may be a link to a home equity loan interactive application form. Activating the dynamic selector 116 presented in the first GUI screen 115-1 may, for example, invoke downloading of the interactive application form, displaying the interactive application form on the display of the electronic device 102, receiving user inputs into the information fields of the interactive application form, and transmitting the completed form.

On the event of the application 112 receiving a second link 117-2, for example in a link notification message or other message from the server 106, the application 112 may couple the dynamic selector 116 to and/or configure the dynamic selector 116 with the second link 117-2, such that selection of the dynamic selector 116 in the second GUI screen 115-2 invokes the functionality associated with the second link 117-2, for example requesting content referenced by the second link 117-2. The second link 117-2 may be a link to content associated with a marketing program of a luxury car brand. Activating the dynamic selector 116 in the second GUI screen 115-2 may, for example, invoke downloading a multi-media advertisement associated with the luxury car brand. As another example, the second link 117-2 may be a link to a restaurant lunch menu. Activating the dynamic selector 116 in the second GUI screen 115-2 may, for example, invoke downloading the restaurant lunch menu and displaying the restaurant lunch menu on the display of the electronic device 102.

Note that the static selectors 118a, 118b, and 118c remain as unchanging parts of the first and second GUI screens 115. The functionality invoked by activating the static selectors 118a, 118b, and 118c may be provided by the GUI 114 or built into the GUI 114 software. The functionality invoked by activating the static selectors 118 remains the same whether the static selector 118 is activated in the first GUI screen 115-1 or the second GUI screen 115-2. By contrast, the functionality invoked by activating the dynamic selector 116 is not provided by the GUI 114 or built into the GUI 114 software but rather is provided by following a link to retrieve content and/or to execute an application. In an embodiment, the position and/or the appearance of the dynamic selector 116 may remain unchanged, but the functionality invoked by activating the dynamic selector 116 changes as link update messages are received by the application 112 and the dynamic selector 116 is coupled to the new links. In an embodiment, the appearance of the dynamic selector 116 may change when the dynamic selector 116 is coupled to new links. The first link 117-1 and the second link 117-2 are depicted as dotted-line boxes in FIG. 2 to indicate that in an embodiment the links 117 may not be visibly manifested in the GUI screens 115.

Returning to FIG. 1, further details of the system 100 are now described. The user profiles 124 may be composed over time in a variety of ways, including analyzing communications activities of the electronic devices 102, 104 and others. The user profiles 124 may contain information comprising one or more of an income level, an education level, a location or residence, a marital status, a number of children, an age, a sex, a current credit score, a history of purchases, a volume of communications activity, and other demographic and/or behavioral information. The user profiles 124 may contain histories of browsing, purchases, playing games, playing audios, and other actions on the electronic devices 102, 104.

The links 126 may comprise a plurality of entries comprising links, for example active links to and/or referencing content, active links to and/or referencing executable applications, and other active links. The content referenced by the links may comprise web pages, multi-media advertisements, audio messages, video messages, and other. Each entry, in addition to comprising a link, may comprise additional information. Each entry may further comprise a price and/or a bid for installing and/or stitching the link into the dynamic selector 116. For example, a bid may offer to pay $100 for stitching the corresponding link contained by the entry into the dynamic selector 116 of the GUI screen 115 of 1000 different electronic devices 102, 104. Each entry may further comprise a target user profile. For example, the target user profile may identify one or more of a preferred income level, a preferred education level, a preferred location or residence, a preferred marital status, a preferred number of children, a preferred age, a preferred sex, a preferred current credit score, a preferred history of purchases, and a preferred volume of communications activity. One or more of these preferences may be defined as a range of values, for example a preferred age of from 18 to 24 or a preferred education level of at least high school diploma. The target user profile further may identify a preferred current location of the electronic device 102. The target user profile may further identify a preferred day of the week and/or time of day.

In an embodiment, the rules engine 120 responds to an event by selecting one of the links 126 to send to the electronic device 102 in a message for updating the dynamic selector 116. The event may be generated by the electronic device 102 and sent in a message to the rules engine 120, for example when the electronic device 102 launches the application 112, when the mobile electronic device 102 changes its location, when the dynamic selector 116 is activated, when one of the static selectors 118 is activated, and/or another event takes place on the electronic device 102. The event may also be generated by the rules engine 120, for example based on a periodic interval, for example every five minutes, every fifteen minutes, every hour, or some other periodic interval. The event may be generated by the rules engine 120 when a new link is received from the third parties 128 or when an update of an existing link 126 is received from the third parties 128, for example an update of an existing link 126 redefining a bid price and/or redefining a target user profile.

The rules engine 120 may select one of the links 126 to send to the mobile electronic device 102, at least in part, by comparing a user profile 124 associated with the electronic device 102 with all of the links 126 to identify a correlation between the user profile 124 associated with the electronic device 102 and a target user profile associated with the links 126. The rules engine 120 may further take into consideration information related to the event, for example a time of day, a location of the mobile electronic device 102, an activation of the dynamic selector 116, an activation of one of the static selectors 118, and the identity of the application 112. The rules engine 120 may further take into consideration the bid associated with the links 126, for example to maximize a payment from the third parties 128. In an embodiment, the rules engine 120 may segregate the links 126 into classes and/or categories to reduce the burden of analyzing links 126 and finding a correlation. In an embodiment, the rules engine 120 may analyze links 126 until a sufficient correlation is found, select that subject link 126, send this link 126 in a message to the electronic device 102, and discontinue further searching and analysis of the links 126. In an embodiment, to avoid uneven handling, the rules engine 120 may mark the location where the search through the links 126 is terminated and begin searching at this point when selecting the next link 126.

The active link contained in the link 126 may be a reference to content stored by the content server 130. In an embodiment, the content server 130 may be coupled to one or more content databases (not shown) that store the referenced content. In an embodiment, the third parties 128 may publish their content to the content server 130.

Figure 3:
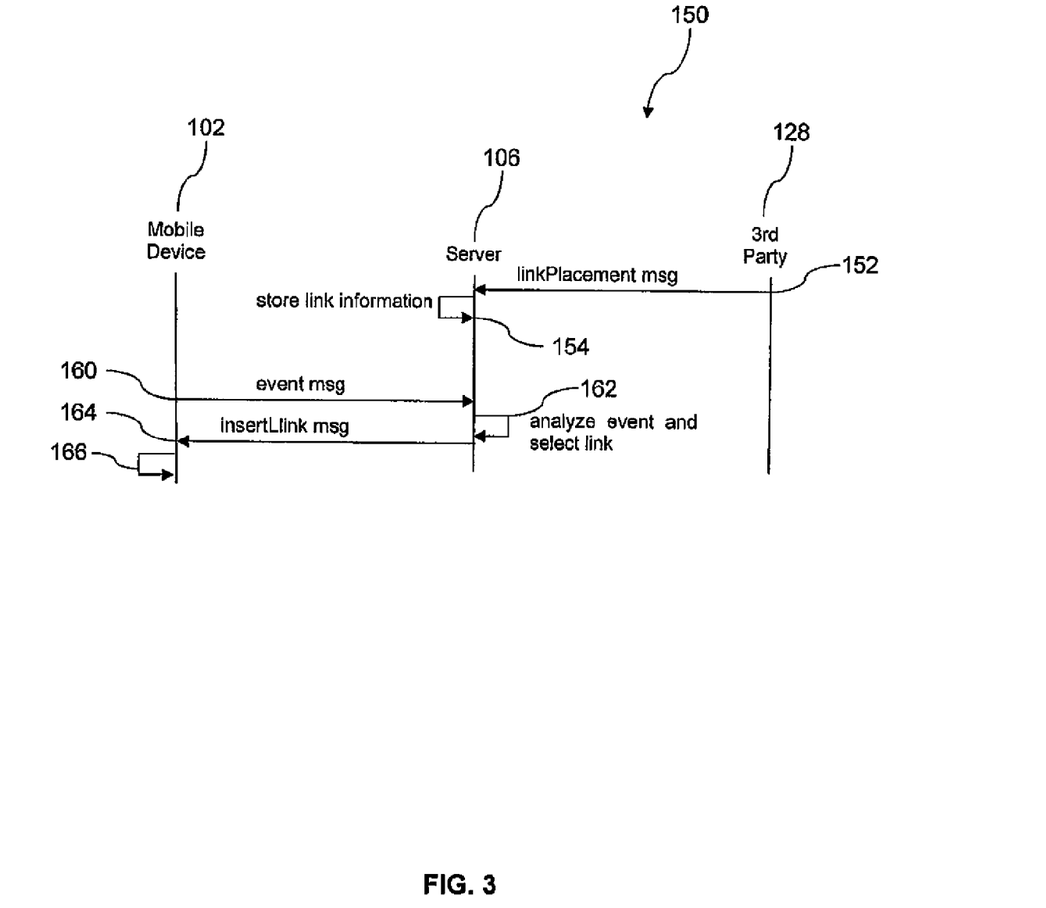
FIG. 3 is a message sequence diagram illustrating a plurality of communications message sequences according to an embodiment of the disclosure.

Turning now to FIG. 3, a message sequence diagram 150 is described. At the top right of FIG. 3, the third party 128 sends a link placement message 152 to the server 106. The server 106 stores the link information in action 154 in the links 126 portion of the database 122. The link information, as described above, may include an active link to content, to an executable application, or to other information or functionality. The link information may include a bid price. The link information may include a target profile or other criteria imposed by the link on the context in which the third party 128 is offering to pay to propagate their link to the dynamic selector 116. Any number of links may be provided by the third parties 128 to the server 106 and at any time, asynchronously with reference to the processing of events by the rules engine 120.

In an embodiment, the server 106 or the rules engine 120 may analyze the link to determine a category of the link information and store the link information in an appropriate segment of the links 126 associated with the subject category. For example, the link information may contain a target user profile directed to females, and the rules engine 120 may store the link information in a female user segment of the links 126 portion of the database 122. As another example, the rules engine 120 may analyze a preferred age of a target user profile of the link information to determine in which of a plurality of age categories to store the link information within the links 126 portion of the database 122, for example in a youth category, a middle-aged category, and an old category. Analyzing the link information as it comes in and distributing to appropriate segments in the links 126 portion of the database 122 may make the process of selecting links for sending to the electronic devices 102, 104 more efficient.

The mobile electronic device 102 sends an event message 160 to the server 106. The event message 160 may identify the electronic device 102, the application 112, a state of the application 112, a location of the electronic device 102, and an event on the electronic device 102. The server 106 delivers the event message 160 to the rules engine 120 in action 162. The rules engine 120 selects one of the links 126, as discussed above, and the server 106 returns the selected link 126 to the electronic device 102 in an insert link message 164. The electronic device 102 updates the dynamic selector 116 with the link embedded in the insert link message 164 in action 166. For example, the application 112 couples the dynamic selector 116 to and/or configures the dynamic selector 116 with the link, such that when the dynamic selector 116 is selected, the functionality associated with the link is invoked.

Figure 4:
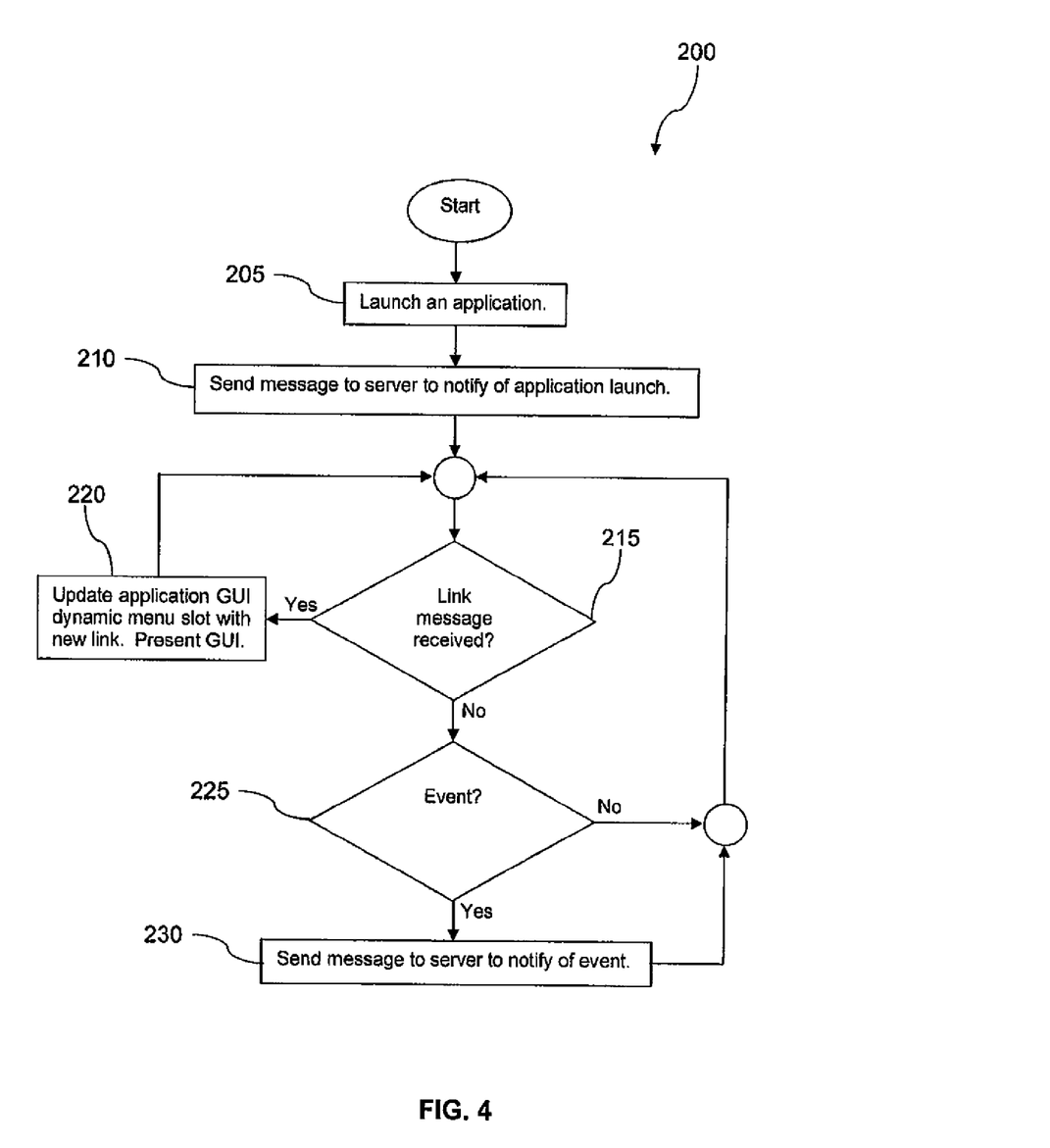
FIG. 4 is a flow chart of a method according to an embodiment of the disclosure.

Turning now to FIG. 4, a method 200 is described. At block 205, the application 112 is launched by the electronic device 102. At block 210, the electronic device 102 transmits a message to the server 106 comprising notification of the launch of the application 112. The message may comprise an identity of the electronic device 102, an identity of the application 112, a location of the electronic device 102, and other information. The server 106 may respond by selecting a link from the links 126 and sending the link to the electronic device 102 in a link message.

At block 215, if a link message is received, the method 200 proceeds to block 220 where the dynamic selector 116 of the GUI 114 is updated in accordance with the link message. For example, the application 112 couples the dynamic selector 116 to and/or configures the dynamic selector 116 with the link contained in the link message, such that when the dynamic selector 116 is selected, the functionality associated with the link is invoked. At block 215 if no link message is received, the method 200 proceeds to block 225. At block 225, if an event has occurred on the electronic device 102, an event notification message is sent by the application 112 to the server 106. Events may comprise a change of location of the electronic device 102; a selection of the dynamic selector 116; a selection of one of the static selectors 118 of the GUI 114, or other event. The event message may comprise the identity of the electronic device 102, the identity of the application 112, the location of the electronic device 102, an identification of the event, and other information.

The blocks 215 and 220 may be repeated indefinitely by the application 112 and/or the GUI 114 while waiting for an event. The method 200 may not be processed continuously, in a busy waiting mode, but the application 112 and/or the GUI 114 may periodically wake up the method 200 and execute it, thereby conserving CPU capacity. It should be noted that the GUI 114 may receive a link message either as a result of having sent an event message to the server 106 at block 230 or as a result of the server 106 generating an event itself and sending the link message.

Figure 5:
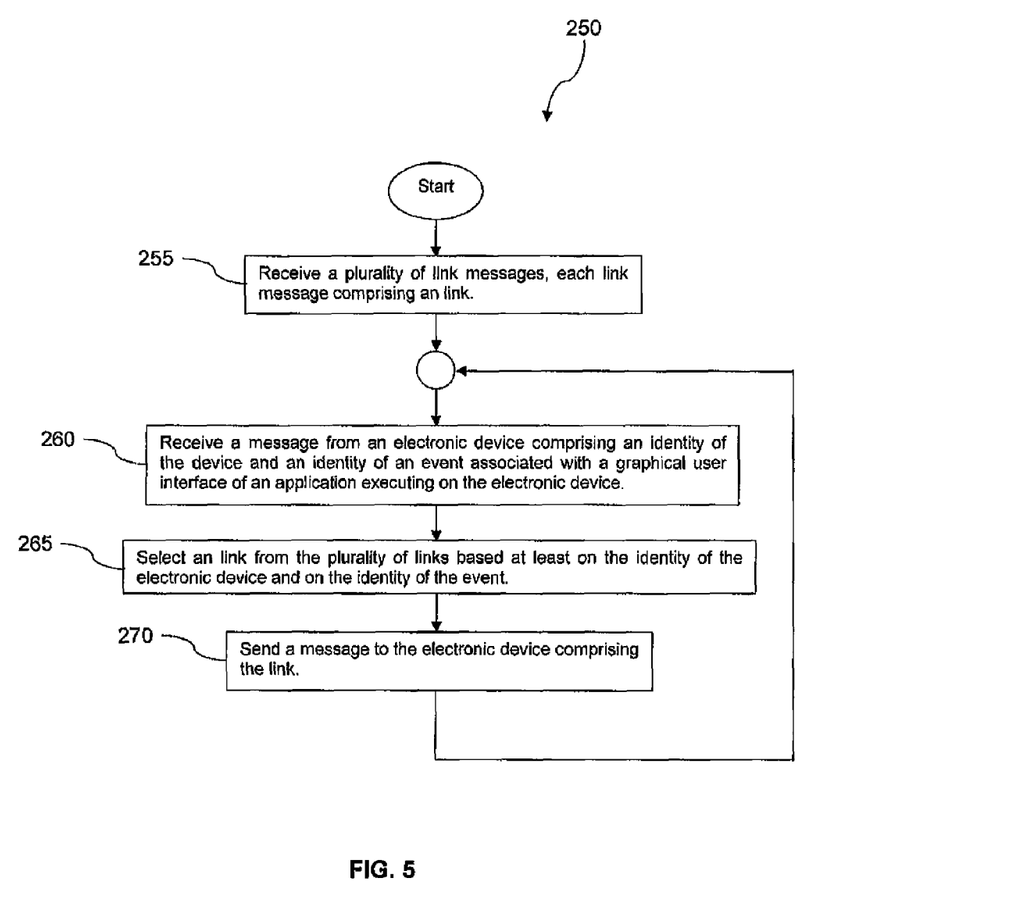
FIG. 5 is a flow chart of another method according to an embodiment of the disclosure.

Turning now to FIG. 5, a method 250 is described. At block 255, the server 106 receives a plurality of link placement messages from the third parties 128. The link placement messages may comprise active links or electronic links. The link placement messages may also comprise a bid price for transmitting the electronic link to a GUI 116 for updating the dynamic selector 116. The link placement messages may also define a target user profile, as described in greater detail above.

At block 260, the server 106 receives a message from the electronic device 102 comprising an identity of the device 102, 104 and an identity of an event associated with the application 112 and/or the GUI 114. At block 265, the server 106 selects one of the links 126 based at least on the identity of the electronic device 102 and the identity of the event. For example, the server 106 may use the identity of the electronic device 102 to access a profile associated with the user of the electronic device 102 and select the link based at least in part on the profile and/or based on segmentation derived from the profile.

At block 270, the server 106 transmits a message to the electronic device 102 comprising the link. The GUI 114 may then update the dynamic selector 116 to reference the electronic link. For example, the application 112 couples the dynamic selector 116 to and/or configures the dynamic selector 116 with the link contained in the message, such that when the dynamic selector 116 is selected, the functionality associated with the link is invoked.

Figure 6:
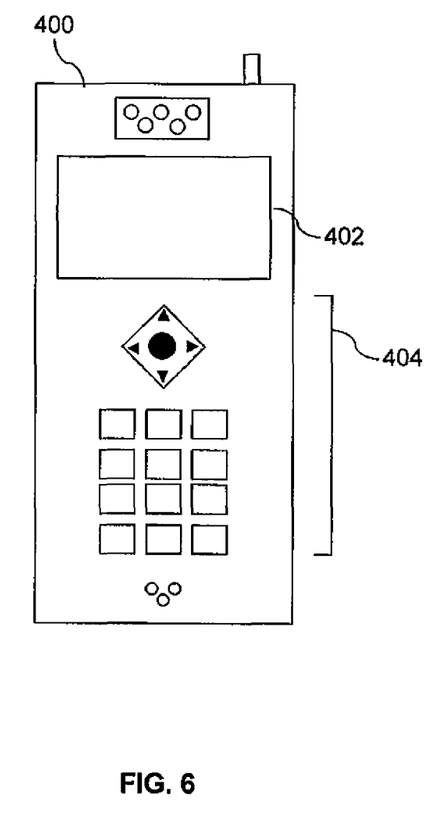
FIG. 6 is a block diagram of a user interface of a handset according to an embodiment of the disclosure.

Turning now to FIG. 6, a handset 400 is described. In some embodiments, the mobile electronic device 102 may be implemented in a form similar to the handset 400. Though illustrated as a mobile phone, the handset 400 may take various forms including a wireless handset, a pager, a personal digital assistant (PDA), a gaming device, an inventory control device, a media player, a digital camera, a digital calculator, a portable computer, a tablet computer, a laptop computer, and/or other. In some embodiments of the present disclosure, the handset 400 is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

Figure 7:
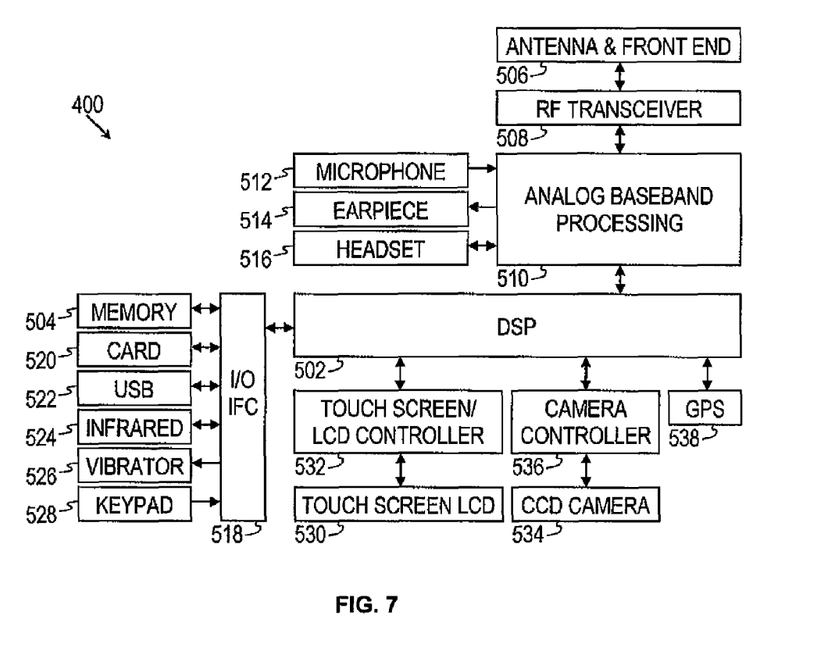
FIG. 7 is a block diagram of a handset according to an embodiment of the disclosure.

FIG. 7 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a radio access network (RAN) or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge coupled device cameras may be employed. Various other peripherals may also be included to provide additional functions, e.g., radio and television reception.

Figure 8:
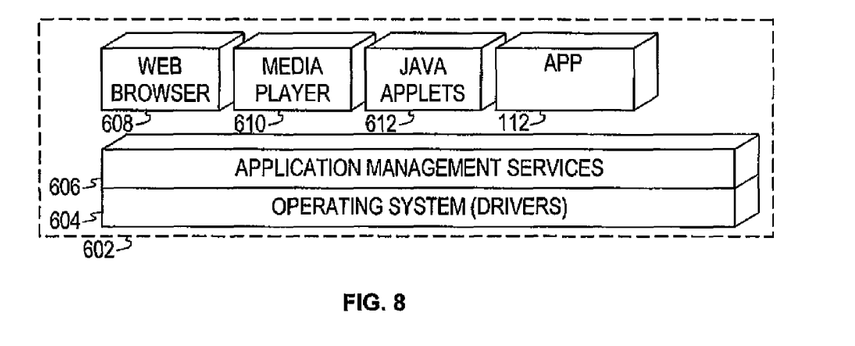
FIG. 8 is a block diagram of a software architecture of a handset according to an embodiment of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 8 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. The application 112 includes the GUI 114 described above. It is understood that in some instances the application 112 may be a JAVA applet 612.

Figure 9:
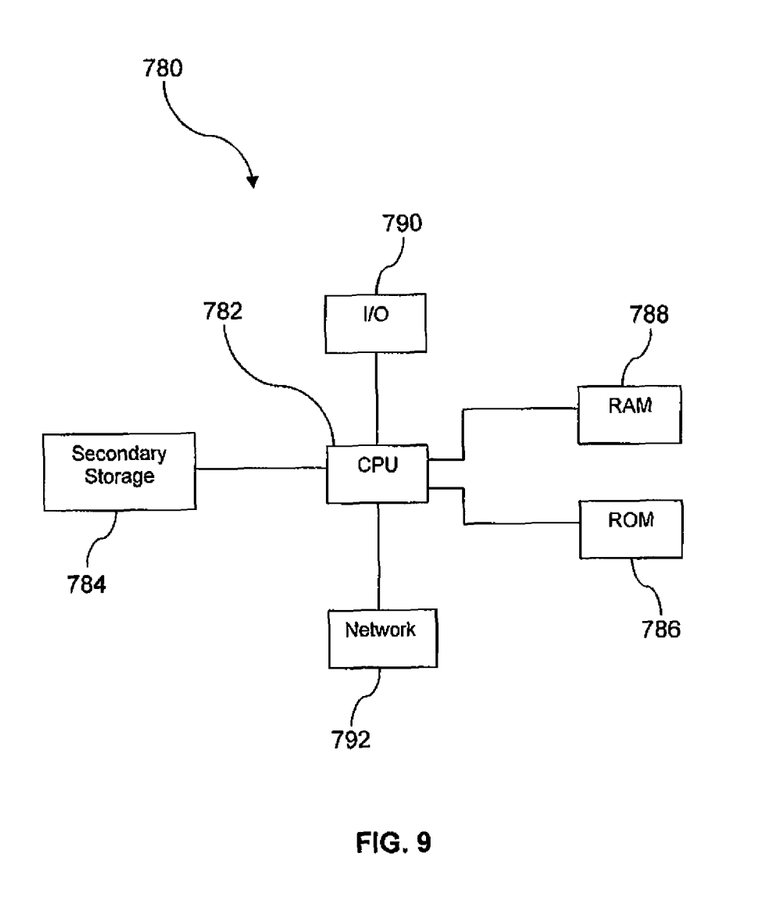
FIG. 9 is an illustration of a computer system according to an embodiment of the disclosure.

Some aspects of the system described above may be implemented on any computer with sufficient processing power, memory resources, and network throughput capability to handle the necessary workload placed upon it. FIG. 9 illustrates a typical computer system suitable for implementing one or more embodiments disclosed herein. The computer system 780 includes a processor 782 (which may be referred to as a central processor unit or (CPU) that is in communications with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer based method for making dynamic associations of content with a dynamic selector on a mobile device, comprising:

launching, by the mobile device executing at least one processor, an initial application that comprises a graphical user interface having a static selector and the dynamic selector, the static selector having functionality that remains unchanged and is provided by the graphical user interface of the initial application, wherein the dynamic selector changes functionality subsequent to the launching of the initial application based on receiving, from a remote server device, a link message or a link update message;

responsive to launching the initial application, receiving, by the mobile device from the remote server device, the link message that provides functionality to the dynamic selector, the link message comprising a link selected based on the identity of the mobile device, a current location of the mobile device, and a user profile of the mobile device, the user profile comprising a history of purchases made using the mobile device;

configuring, by the mobile device, the graphical user interface of the initial application to couple the dynamic selector of the graphical user interface of the initial application to the link;

presenting, by the mobile device, a screen of the graphical user interface of the initial application, the screen comprising the dynamic selector and the static selector, wherein selecting the dynamic selector activates the link, wherein the dynamic selector is updated when the mobile device changes location;

generating an event by at least, launching another application on the mobile device, the another application comprising another graphical user interface having at least another dynamic selector that provides functionality subsequent to launching the another application based on receiving, from the remote server, another link message;

in response to the generation of the event, transmitting, by the mobile device, an event message to the remote server device, the event message comprising the identity of the mobile device, an identity of the another application launched by the mobile device, and the location of the mobile device;

in response to the event message, receiving, by the mobile device from the remote server device, the another link message that provides functionality to the another dynamic selector of the another application, the another link message comprising another link selected based on the identity of the mobile device, the identity of the another application, and the location of the mobile device; and configuring, by the mobile device, the another graphical user interface of the another application to couple the another dynamic selector to the another link.

2. The method of claim 1, wherein the mobile device communicates with the remote server device at least in part over a wireless communications link.

3. The method of claim 2, further comprising:

presenting, by the mobile device, another screen of the another graphical user interface associated with the another application, the another screen comprising at least the another dynamic selector and another static selector, wherein selecting the another dynamic selector activates the another link.

4. The method of claim 1, further comprising:

transmitting, by the mobile device, a second event message to the remote server device, the second event message comprising the identity of the mobile device and graphical user interface event information, the graphical user interface event information associated with at least one of activation of the static selector associated with the initial application, a purchase event associated with the initial application, and a payment method selection event associated with the initial application.

5. The method of claim 1, further comprising transmitting, by the mobile device, a link request message comprising a request to receive a different link for any of the initial application and the another application.

6. The method of claim 5, wherein transmitting the link request message is triggered based on passage of a defined period of time.

7. The method of claim 5, wherein transmitting the link request message is triggered based on selection of one of the dynamic selector or the another dynamic selector.

8. A computer based method for making dynamic associations of content with a dynamic selector, comprising:

receiving, by a computer executing at least one processor, a plurality of links;

receiving, by the computer, an event message from an electronic device, the event message comprising an identity of the electronic device and an identity of a first event, the electronic device comprising an application that includes a graphical user interface having a static selector and the dynamic selector, the static selector having functionality that remains unchanged and is provided by the graphical user interface of the application, wherein the dynamic selector changes functionality subsequent to launching of the application based on receiving, from the computer, a link message or a link update message;

in response to receiving the event message, selecting, by the computer, a link from the plurality of links by correlating the identity of the electronic device, the identity of the first event, and a user profile of the electronic device with a target profile associated with the link, wherein the user profile comprises a current location of the electronic device and a history of purchases made using the electronic device, and wherein the target profile comprises information to identify target devices for the link based on current location and history of purchases;

sending, by the computer to the electronic device, the link message comprising the link that provides functionality to the dynamic selector, wherein the electronic device stitches the link into a dynamic selector of the graphical user interface of the application executing on the electronic device in response to the link message being sent to the electronic device;

responsive to a second event, selecting, by the computer, an updated link from the plurality of links based at least on the identity of the electronic device, wherein the second event is any of a receipt of a new link from a content server and a receipt of an update associated with a previously received link from the content server;

and sending, by the computer to the electronic device, the link update message that changes the functionality of the dynamic selector, the link update message comprising the updated link.

9. The method of claim 8, further including analyzing, by the computer, a price associated with each of the plurality of links, wherein selecting the link by the computer is based at least in part on analyzing the prices.

10. The method of claim 8, wherein each link of the plurality of links is associated with a plurality of bid prices, the plurality of bid prices associated with a plurality of target profiles.

11. The method of claim 8, wherein the first event is associated with at least one of an activation of the static selector of the graphical user interface of the application executing on the electronic device and the launching of the application executing on the electronic device.

12. The method of claim 8, wherein the electronic device stitches the updated link into the dynamic selector of the graphical user interface of the application executing on the electronic device in response to the link update message being sent to the electronic device.

13. A system for making dynamic associations of content with a dynamic menu slot of a graphical user interface, comprising:

a non-transitory memory;

a processor; and a server application stored in the non-transitory memory that, when executed by the processor, receives a plurality of marketing offers, each marketing offer comprising a link to content associated with the corresponding marketing offer, at least a first bid price associated with presenting the link in a dynamic menu slot of a graphical user interface of an initial application presented on a mobile device external to the processor, and a target user profile comprising information to identify target users for the link based on current location and history of purchases, wherein the graphical user interface of the initial application further includes a static selector having functionality that remains unchanged and is provided by the graphical user interface of the initial application, and wherein the dynamic menu slot of the graphical user interface of the initial application changes functionality subsequent to launching of the initial application in response to a link message, receives an event message from the mobile device, the event message comprising an identity of the mobile device and information about an event associated with one of the mobile device and the graphical user interface presented on the mobile device, selects a link associated with one of the plurality of marketing offers based on a correlation of the target user profile of the marketing offer with the information about the event, the identity of the mobile device, a current location of the mobile device, and a user profile comprising a history of purchases made using the mobile device, transmits the link message to the mobile device, the link message comprising the link that provides functionality to the dynamic menu slot of the graphical user interface of the initial application, wherein the mobile device stitches the link into the dynamic menu slot of the graphical user interface in response to the link message being transmitted to the mobile device, receives another event message from the mobile device comprising the identity of the mobile device, an identity of another application launched by the mobile device, and the location of the mobile device, wherein the another application comprises another graphical user interface having another dynamic menu slot that provides functionality subsequent to the launching the another application, and in response to the another event message, transmits, to the mobile device, another link message comprising another link that provides functionality to the another dynamic selector, wherein the transmission is based on the identity of the mobile device, the identity of the another application, and the location of the mobile device, and wherein the mobile device stitches the another link into the another dynamic menu slot of the another graphical user interface of the another application in response to the transmission of the another link message to the mobile device.

14. The system of claim 13, further comprising a database that is communicatively coupled with the processor, wherein the server application, when executed by the processor, further stores the plurality of marketing offers in a non-transitory memory of the database, wherein the database further comprises a plurality of user profiles that are each associated with at least one corresponding mobile device of a plurality of mobile devices that are external to the processor, including the user profile associated with the mobile device.

15. The system of claim 14, wherein the plurality of user profiles associated with the plurality of mobile devices further comprise information about a user associated with one of the plurality of mobile devices comprising at least one of an income level, an education level, a location of residence, a marital status, a number of children, an age, a sex, and a current credit score.

16. The system of claim 13, wherein the another event message is received by the server application in response to the launching of the another application on the mobile device.

17. The method of claim 1, further comprising subsequent to receiving at least one of the link message and the link update message, modifying, on the mobile device, a firmware application, wherein the firmware application comprises at least one of the corresponding initial application and the another application.

18. The method of claim 17, wherein the firmware application is stored in a secure element of the mobile device and prevents user modification of the dynamic selector of the initial application subsequent to an initial installation of the firmware application.

* * * * *